United States Patent [19]

Stewart

[11] Patent Number: 4,850,928
[45] Date of Patent: Jul. 25, 1989

[54] RATTLING ANTLERS WITH THIN FIN MEMBERS

[75] Inventor: Johnny E. Stewart, Waco, Tex.

[73] Assignee: Johnny Stewart Game Calls, Inc., Waco, Tex.

[21] Appl. No.: 33,282

[22] Filed: Apr. 2, 1987

[51] Int. Cl.$^4$ .................. A63H 5/00; A01K 15/00
[52] U.S. Cl. .................. 446/397; 446/421; 428/16; 428/542.4; 119/29
[58] Field of Search .............. 446/387, 418, 421; 119/29, 144; 428/16, 542.4; 434/295, 296

[56] References Cited

U.S. PATENT DOCUMENTS

| | | | |
|---|---|---|---|
| 2,003,896 | 6/1935 | Menger | 428/542.4 |
| 3,224,412 | 12/1965 | Fuentes, Jr. | 119/144 |
| 3,834,354 | 9/1974 | Kelton | 119/144 |
| 4,464,440 | 8/1984 | Dotzman | 428/542.4 |
| 4,610,641 | 9/1986 | Allen | 446/397 |
| 4,717,626 | 1/1988 | Badger | 428/542.4 |

FOREIGN PATENT DOCUMENTS 1137119  5/1957  France .................. 446/99

OTHER PUBLICATIONS

Sasser, Ray, "Antler Rattling", Outdoor Life, Jun. 1984, p. 60.
Brister, Bob, "A New Twist to Rattling", Field and Stream, 1985.
Sasser, Ray, "Space-Age Deer Antlers", Southern Outdoors, Dec. 1985, p. 10.

Primary Examiner—Mickey Yu
Assistant Examiner—Charles H. Harris
Attorney, Agent, or Firm—Diller, Ramik & Wight

[57] ABSTRACT

A pair of synthetic antlers, each of which includes at least a handle and two tines, one of the antlers having fins along the tines and upon clashing/striking the antlers together, the fins produce palmated sounds effective for rattling-in deer, elk and like antlered animals.

18 Claims, 3 Drawing Sheets

U.S. Patent Jul. 25, 1989 Sheet 1 of 3 4,850,928
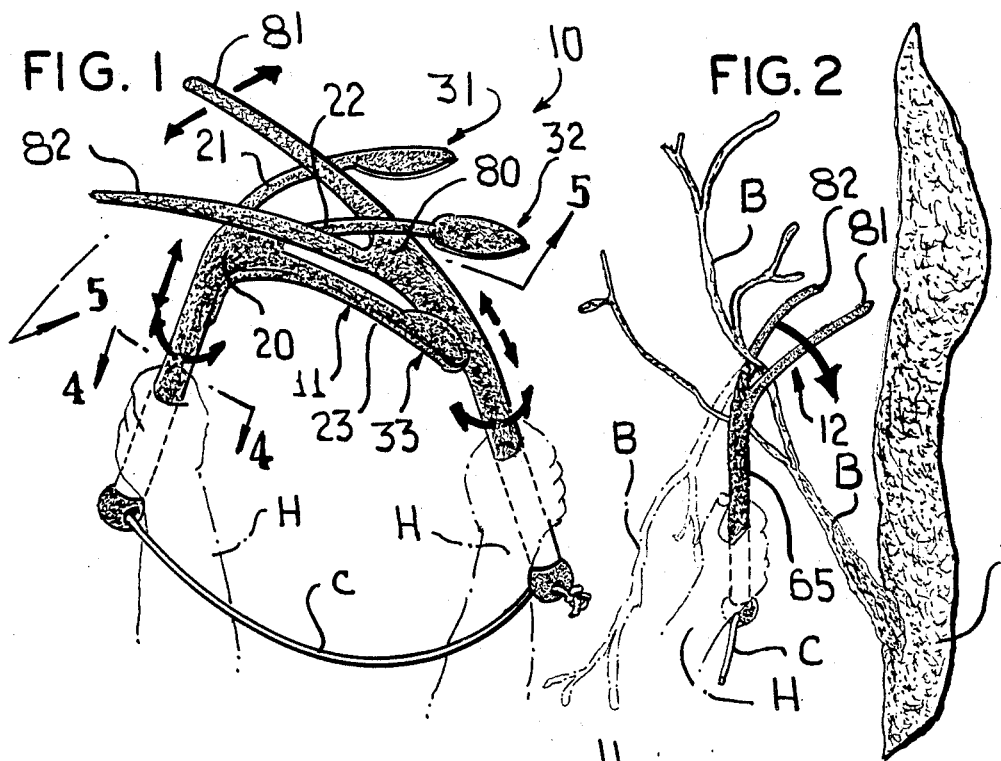
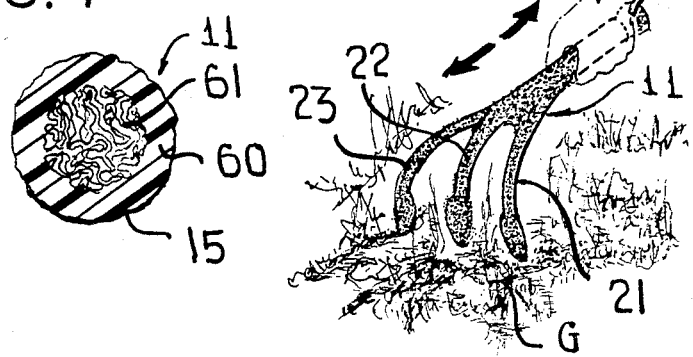
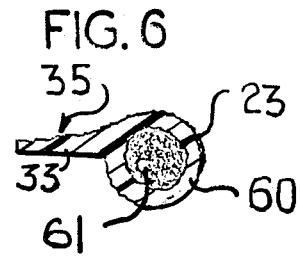
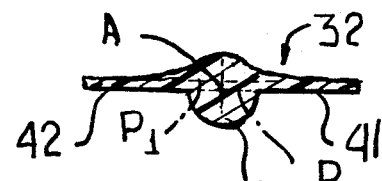
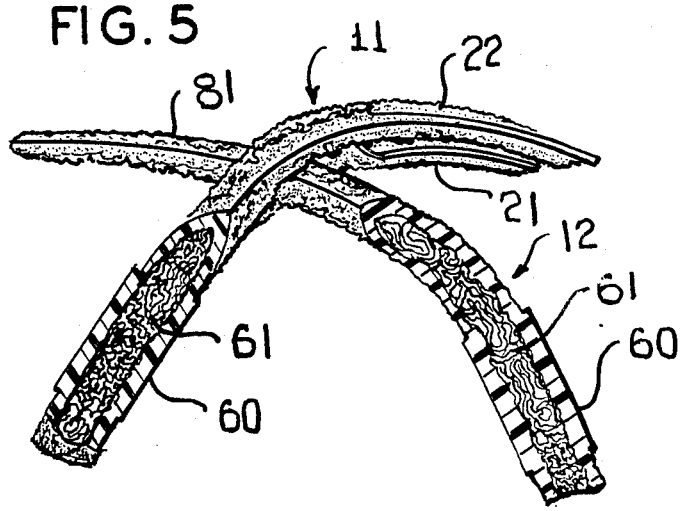
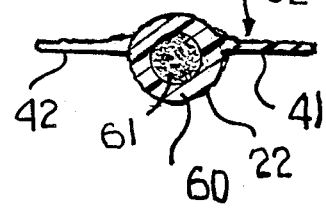

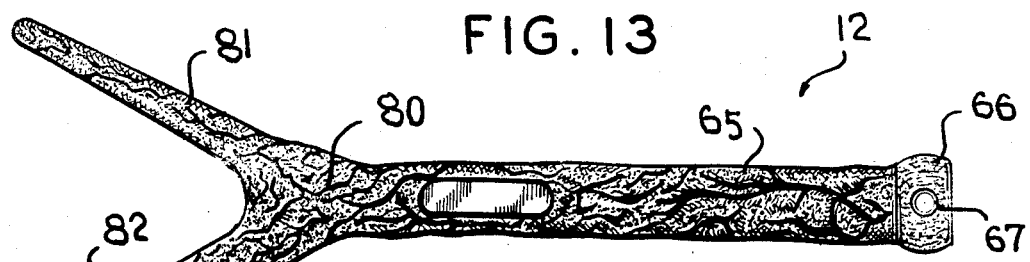
FIG. 13
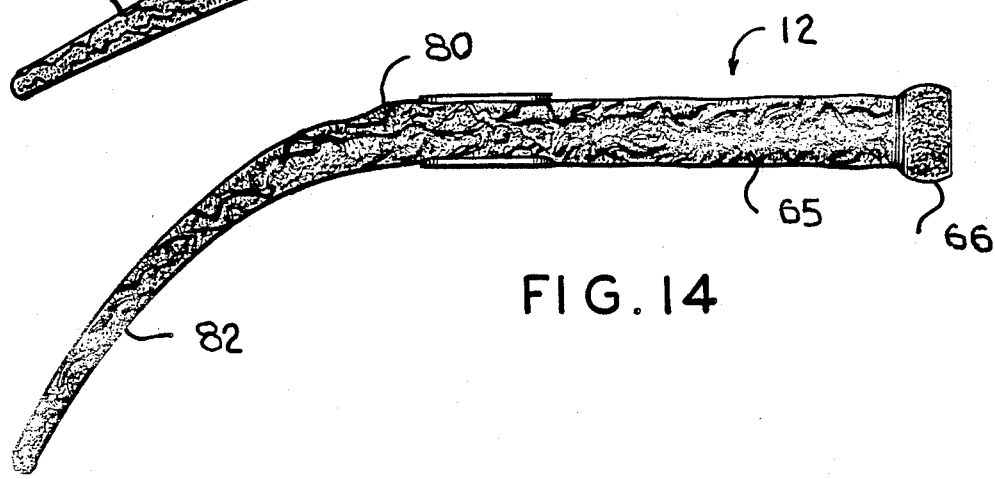
FIG. 14
FIG. 15
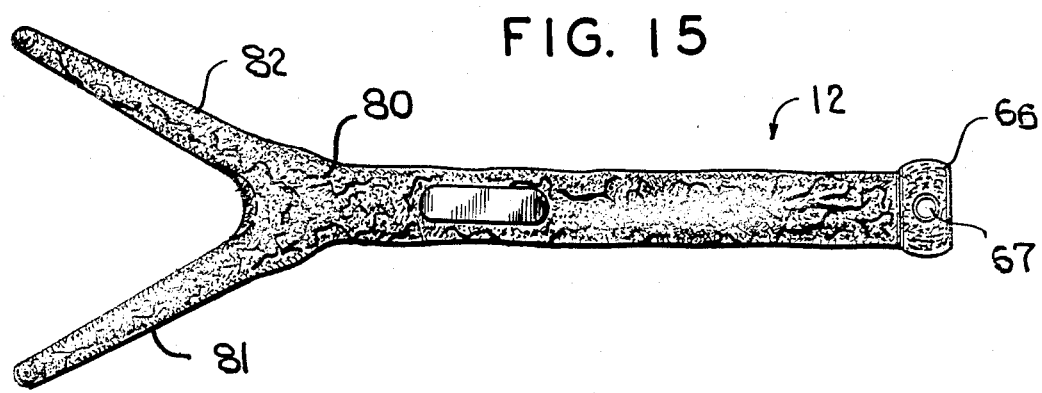
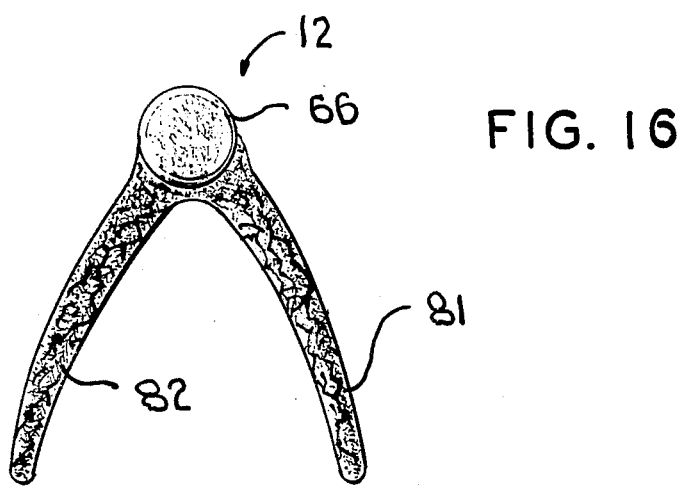
FIG. 16

4,850,928

RATTLING ANTLERS WITH THIN FIN MEMBERS

BACKGROUND OF THE INVENTION

The invention is directed to equipment for attracting deer, elk and the like, particularly the male ("bucks") of the species, the equipment including a pair of synthetic "antlers" of which at least one of the pair of antlers is of a generally a palmated configuration whereby a user can strike the synthetic antlers against each other to reproduce sounds of actual animal antlers, particularly the highly desirable sound of palmated whitetail deer antlers.

DESCRIPTION OF RELATED ART

Whitetail and muledeer antlers were used for years to "rattle" deer, elk and the like. The inventor himself used such antlers in the early 1960's to attract and film deer. Most recently synthetic antlers have been patented (U.S. Pat. No. 4,610,641), and the purpose thereof is to attract deer and elk through the imitation of the sound of clashing antlers.

SUMMARY OF THE INVENTION

While both actual antlers, normally white and weathered from long exposure to the elements, and synthetic antlers as aforesaid have been utilized to attract deer, elk and the like, it has been found difficult to reproduce the sound of animal antlers utilizing synthetic materials. However, the invention herein virtually reproduces the exact sounds of antlers when clashed together by deer, elk and the like by providing at least one of a pair of antlers of a generally palmated configuration defined by two or more tines and a handle, and the tines having relatively thin fins carried by free ends thereof. Due to the latter fins configuration, the pair of antlers, when struck together, produce a "palmated" sound or effect which virtually identically simulates sounds produced by animals when clashing their antlers, as most often occurs during rutting season.

In the preferred embodiment of the invention, one of the pair of antlers is palmated and includes three tines and a handle, whereas the other of the pair of antlers has two tines and no fins (unpalmated). Preferably, the palmated antler is held in the lefthand with the tines pointing downward, and the two tines of the unpalmated antler are similarly pointed down so that they straddle the centerline of the palmated pair of antlers. The two tine unpalmated antler is then used to strike hard against the three tine palmated antler, preferably at the base of the tines of the latter with attendant twisting and scraping to produce the desired "palmated" sound effects of deer and elk antlers. Furthermore, either of the pair of antlers can also be used to dig into the ground, break tree limbs or vigorously rake brush, all acts performed by deer, elk and the like during rutting season. The latter is accomplished by the two prong antler to prevent breakage of the fins of the palmated antler. Thus, by providing a pair of rattling antlers of which a least one is palmated, the user achieves the desired "palmated" sound effects of natural animal antlers when clashed by the animals themselves, particularly the sound of palmated whitetail deer antlers, thus virtually assuring rattling effectiveness at all times of the year and virtually in all areas of the country.

With the above and other objects in view that will hereinafter appear, the nature of the invention will be more clearly understood by reference to the appended claims and the several views illustrated in the accompanying drawings.

BRIEF DESCRIPTION OF THE DRAWINGS

FIG. 1 is a top perspective view of a pair of synthetic antlers constructed in accordance with this invention, and illustrates a three tine palmated antler being clashed with a two tine unpalmated antler.

FIG. 2 is a perspective view of the two tine unpalmated antler, and illustrates the manner in which the same is gripped to break twigs or branches.

FIG. 3 is a highly schematic view, and illustrates the manner in which the palmated antler can be used to scratch or dig ground or brush to simulate like activiy of deer, elk or the like.

FIG. 4 is an enlarged cross-sectional view taken generally along line 4—4 of FIG. 1, and illstrates a relatively porous interior and nonporous exterior of the synthetic plastic of the antlers.

FIG. 5 is a fragmentary enlarged cross-sectional view taken generally along line 5—5 of FIG. 1, and illustrates the manner in which the more porous interior of the antlers is encased by the impervious harder outside skin.

FIG. 6 is an enlarged cross-sectional view taken generally along line 6—6 of FIG. 9, and illustrates a fin along the lateral edge of a tine of the palmated antler.

FIG. 7 is an enlarged cross-sectional view taken generally along line 7—7 of FIG. 9, and illustrates the manner in which the ends of the tines are constructed throughout of relatively rigid tough nonpourous synthetic plastic material.

FIG. 8 is an enlarged cross-sectional view taken generally along line 8—8 of FIG. 9, and illustrates the progressive reduction in cross-section of the porous central area of the tine.

FIG. 13 is a top plan view of the unpalmated antler, and illustrates two tines and a handle thereof.

FIG. 14 is a side elevational view of the unpalmated antler, and generally illustrates the curvature thereof.

FIG. 15 is a bottom plan view of the unpalmated antler.

FIG. 16 is an end view of the unpalmated antler looking from right-to-left in FIGS. 13 through 15.

DESCRIPTION OF THE PREFERRED EMBODIMENT

Figure 9:
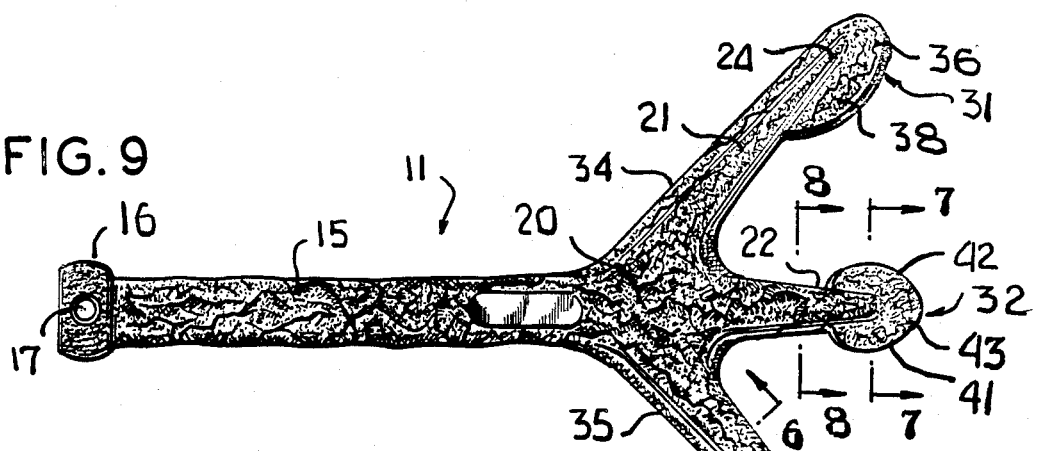
FIG. 9 is a top plan view of the palmated antler, and illustrates a handle and three tines thereof with the tines having lateral fins to produce a "palmated" sound when clashed with the unpalmated antler of FIGS. 13 through 16.

Reference is made to FIG. 1 of the drawings which illustrates equipment for attracting deer, elk and the like in the form of a pair of synthetic antlers which are generally designated by the reference numeral 10.

The pair of antlers 10 include a palmated (webfooted) antler 11 (FIGS. 9 through 12) and an "unpalmated" antler 12 (FIGS. 13 through 16). The antlers 11, 12 are gripped by user's hands H (FIG. 1) and struck, clashed or rattled together in the manner indicated by the unnumbered oppositely headed arrows in FIG. 1 to simulate clashing antlers of, for example, whitetail deer, muledeer, elk or the like. Such striking or clashing of the antlers 11, 12 together is very effective during the rutting season to attract horned animals which also use their antlers to break twigs, scratch ground, etc. The latter activities can also be simulated by the pair of antlers 10 of the present invention with, for example, the unpalmated antler 12 being usd to break twigs or branches B (FIG. 2) from a tree T. In a similar fashion the unpalmated antler 12 or the palmated antler 11 (FIG. 3) can be used to scratch the ground G or brush, again to simulate actual movements/sounds created by antlered animals.

The palmated antler 11 (FIGS. 9 through 12) is formed of synthetic polymeric or copolymeric plastic material and includes a handle 15 having an enlarged end 16 with a hole 17 passing therethrough for receiving a cord C (FIG. 1) for carrying the pair of antlers 10 when not in use. The palmated antler 11 includes a juncture portion 20 from which emanates three tines or prongs 21 through 23 carrying respective means 31 through 33 for creating "palmated" sound effects of antlers produced by antlered animals when the pair of antlers 10 are clashed/struck in the manner graphically depicted in FIG. 1. The means 31 through 33 are relatively thin fins carried by at least one of the tines, but preferably all three of the tines 21 through 23.

Figure 10:
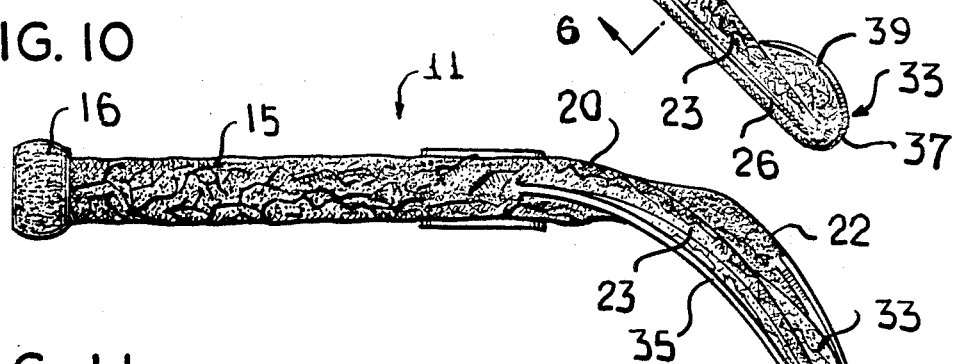
FIG. 10 is a side elevational view of the palmated antler of FIG. 9, and illustrates a fin extending along generally the entire length of an outboardmost of the tines.
Figure 11:
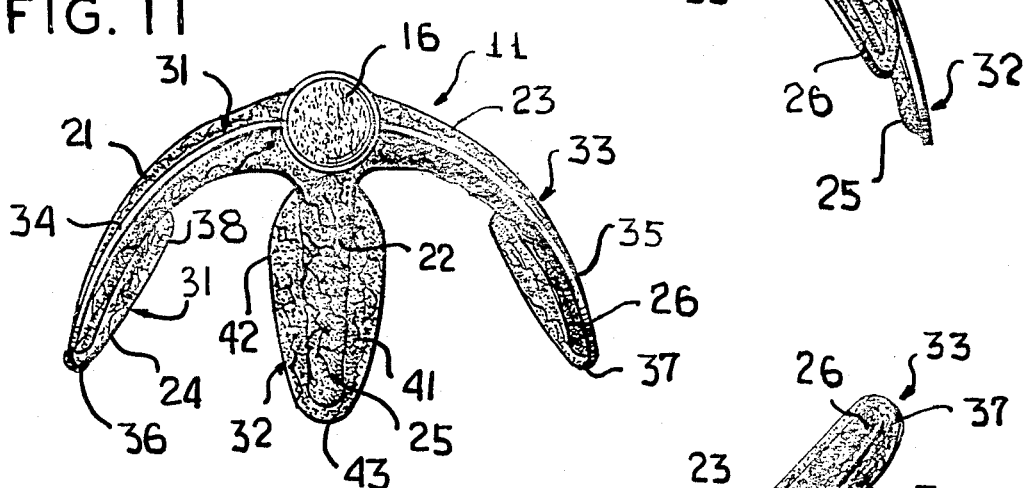
FIG. 11 is an end view of the palmated antler looking from left-to-right in FIGS. 9 and 10, and more clearly illustrates the fins of the three tines.
Figure 12:
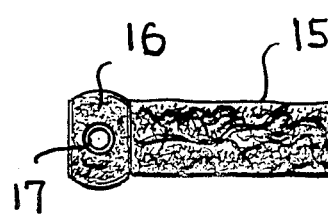
FIG. 12 is a bottom view of the palmated antler, and illutrates the more abrupt line of demarcation of the fins relative to the tines along the bottom of the palmated antler, as compared to a more gradual juncture of the fins with the tines at the top surface (FIG. 9).

As is most readily apparent from FIGS. 9, 11 and 12, the tines 21 through 23 progressively diverge from the juncture portion 20 toward respective tine ends 24 through 26. Furthermore, the tines 21 through 23 are also progressively curved downwardly, as viewed in FIG. 10, from approximately the juncture portion 20 to the ends or end portions 24 through 26.

The means or fins 31 through 33 are integrally formed during the molding of the palmated antler 11. The fins 31, 33 are generally identical from the standpoint of each being defined by respective lateral fin portions 34, 35 which extend along the lateral outboard edges (unnumbered) or sides of the tines 21, 23. The fin portions 34, 35 merge with respective end fin portions 36, 37, respectively and the latter in turn respectively merge with laterally inboard fin portions 38, 39, respectively. The laterally inboard fin portions 38, 39 are slightly wider and shorter than the laterally outboard fin portions 34, 35, as is most readily apparent from FIGS. 9 and 12.

The tine 32 includes relatively short lateral fin portions 41, 42 at opposite sides of the tine or prong 22 (FIGS. 9 and 12), and a fin end portion 43. As viewed from above (FIG. 9), the upper surface (unnumbered) of the palmated antler 11 progressively and gradually merges throughout its extent, but particularly at the juncture of the tines 21 through 23 with the respective fins 31 through 33 thereof. However, this juncture is more abrupt at the underside of the palmated antler 11, as is most readily apparent from FIG. 12. More over, during the molding process, the copolymeric or polymeric plastic material conforms to and contacts the interior heated surface of the mold and the latter creates a relatively thick impervious skin or surface layer 60 (FIGS. 6 and 8) surrounding an interior less cured and more porous core 61 which runs generally the entire length of the handle 15, the juncture portion 20, and the tines 21 through 23 as the latter decrease in cross-sectional area from the juncture portion 20 through the ends 24 through 26 thereof. However, since the ends 24 through 26 are of relatively small crosssectional area, the polymeric/copolymeric material cures completely, as does the thinner material of the fins 31 through 33, and in these areas there is no porous core, as is most evident from FIG. 7. Hence, the fins are relatively nonporous, tough and rigid (See FIG. 7), whereas the tines and handle are relatively centrally porous, resilient, tough and strong which are extremely desirable characteristics, particularly when it is recognized that the preferred manner of clashing the pair of antlers 11 against each other is to strike the tines against each other at the junction portions of each, as is most apparent from FIG. 1. Thus, the tough and strong center core 61 of both antlers 11, 12 permits the clashing/striking noted without breakage whereas the somewhat more brittle, though still tough and rigid, fins 31 through 33 create the palmated sound effect of "live" animal antlers when manipulated by the animals themselves.

Each of the tines 21, 22 and 23 includes a center axis or longitudinal center line A, as is illustrated in FIG. 7 relative to the tine 22. Furthermore, a plane P (FIG. 7) taken through the center line, center axis or longitudinal center line A of each of the tines 21–23 is also in offset relationship and generally parallel to the associated thin fin and a plane $P^1$ (FIG. 7) taken therethrough. Thus, the planes P, $P^1$ are generally parallel to each other but the plane $P^1$ is offset from the plane P taken through the axis A of each of the associated tines 21–23 and respective fins 31–33 thereof. Obviously, since the tines 21–23 are curved, as is best illustrated in FIG. 10, the longitudinal center line A of each defines a relatively smooth curve (not shown but readily visualized from FIGS. 10 and 11).

The unpalmated antler 12 (FIGS. 13 through 16) also includes a handle 65 having an enlarged end 66 with an opening 67 therethrough for receiving the cord or rope C (FIG. 1). The handle 65 merges with a juncture portion 80 and in turn the latter merges with a pair of tines or prongs 81, 82 which are curved relative to the handle 65 (FIG. 14) in much the same manner and to the same degree as the curvature of the tines 21 through 23 relative to the handle 15 (Compare FIGS. 10 and 14). However, the tines or prongs 81, 82 have no means corresponding to the palmated sound effect creating means or fins 31 through 33 of the palmated antler 11. However, the antler 12 is constructed from the same polymeric/copolymeric plastic material and includes a central tough core and an outer more rigid impervious cured skin, corresponding to the components 61, 60 (FIG. 5).

As was noted heretofore, the antlers 11, 12 are preferably clashed at the juncture portions 20, 80 thereof (FIG. 1) to ensure that the toughest and strongest portions of the pair of antlers 10 will receive the impact and thus preclude breakage. However, during this same striking or clashing, the fins 31 through 33 will both reverberate if not directly struck and will also vibrate if directly struck by the prongs 81, 82. Thus, by both clashing and lightly touching the antlers 11, 12 against each other, the palmated facsimile sound is produced. However, an effort should be made in using the pair of antlers 10 to avoid striking the thin fins 31 through 33 directly by the prongs 81, 82, since such is neither desired nor necessary to create the palmated effect. The latter may also cause the fins 31 through 33 to chip or break and through this will not adversely effect the overall sound produced by the antlers 10, maximum palmated effect will be achieved by maintaining fin integrity. Furthermore, maximum palmated sound effect is produced simply by striking the antlers together at their juncture so that reverberation or vibration along the tines 21 through 23 creates the desired sounds. Furthermore, when the antlers are merely twisted and scraped together through an arcuate motion, as is also indicated by the unnumbered double-headed arrows in FIG. 1, an equally palmated sound effect is produced without vigorous striking or impacting. The desired sound effect will, with very litle experience and use, become readily apparent to the user.

Furthermore, though the palmated antler 11 has been shown in FIG. 3 to be used to scratch the ground G, this may be undesired if the ground is relatively hard or rocky, and the unpalmated antler 12 is equally employed for scraping the ground or underbrush. When used in this fashion, the pair of antlers 10 viritually assure that deer, elk and the like can be "rattled in", particularly during the rutting season.

Although a preferred embodiment of the invention has been specifically illustrated and described herein, it is to be understood that minor variations may be made in the apparatus without departing from the spirit and scope of the invention, as defined in the appended claims.

I claim:

1. Equipment for attracting deer and the like comprising a pair of synthetic antlers, each of said pair of antlers including at least two tines and a handle whereby a user can grip the handles and strike the tines to reproduce sounds of actual animal antlers when clashed, rubbed or scraped together, fin means carried by at least one tine of at least one of said pair of antlers for creating the sound of real antlers when the pair of synthetic antlers are struck against each other, and the other pair of said pair of antlers is devoid of said fin means.

2. The deer or like attracting equipment as defined in claim 1 wherein said at least one tine has a center axis, and said palmated antlers sound creating means is offset to one side of a plane through said center axis.

3. The deer or like attracting equipment as defined in claim 1 wherein said at least one tine has a longitudinal center line, and said longitudinal centerline defines a relatively smooth curve.

4. Equipment for attracting deer and the like comprising a pair of synthetic antlers, each of said pair of antlers including at least two tines and a handle whereby a user can grip the handles and strike the tines to reproduce sounds of actual animal antlers when clashed, rubbed or scraped together, fin means carried by at least one tine of at least one of said pair of antlers for creating the sound of real antlers when the pair of synthetic antlers are struck against each other, said fin means is a relatively thin fin carried by said at least one tine, and the other of said pair of antlers is devoid of a relatively thin fin.

5. The deer or like attracting equipment as defined in claim 4 wherein said at least one tine has a center axis, and said palmated antlers sound creating means is offset to one side of a plane through said center axis.

6. The deer or like attracting equipment as defined in claim 4 wherein said at least one tine has a longitudinal center line, and said longitudinal centerline defines a relatively smooth curve.

7. Equipment for attracting deer and the like comprising a pair of synthetic antlers, each of said pair of antlers including at least two tines and a handle whereby a user can grip the handles and strike the tines to reproduce sounds of actual animal antlers when clashed, rubbed or scraped together, fin means carried by at least one tine of at least one of said pair of antlers for creating the sound of real antlers when the pair of synthetic antlers are struck against each other, said at least one tine has a free end portion defined in part by a terminal end surface and opposite side surfaces, said fin means is a relatively thin fin and said thin fin projects from and extends along at least one of said surfaces.

8. The deer or like attracting equipment as defined in claim 7 wherein said at least one tine has a longitudinal center line, and said longitudinal centerline defines a relatively smooth curve.

9. The deer or like attracting equipment as defined in claim 7 wherein said at least one surface is said terminal end surface.

10. The deer or like attracting equipment as defined in claim 9 wherein said at least one surface is one of said opposite side surfaces.

11. The deer or like attracting equipment as defined in claim 6 wherein said at least one surface is both of said opposite side surfaces.

12. The deer or like attracting equipment as defined in claim 6 wherein said at least one surface is one of said opposite side surfaces and said terminal end surface.

13. The deer or like attracting equipment as defined in claim 6 wherein said at least one surface is all of said terminal and opposite side surfaces.

14. The deer or like attracting equipment as defined in claim 6 wherein said at least one surface is both of said opposite side surfaces, and the length of said fin along one of said side surfaces being appreciably longer than the length of said fin along the other of said side surfaces.

15. The deer or like attracting equipment as defined in claim 6 wherein said at least one surface is both of said opposite side surfaces, the length of said fin along one of said side surfaces being appreciably longer than the length of said fin along the other of said side surfaces, said at least one tine in an outermmost of a plurality of tines, and said longer length is an outside side of said at least one tine.

16. The deer or like attracting equipment as defined in claim 7 wherein said at least one tine has a center axis, and said fin means is offset to one side of a plane through said center axis.

17. The deer or like attracting equipment as defined in claim 16 wherein said at least one surface is all of said terminal and opposite side surfaces.

18. The deer or like attracting equipment as defined in claim 8 wherein said at least one surface is all of said terminal and opposite side surfaces.

* * * * *